United States Patent [19]

Malec

[11] Patent Number: 4,476,803
[45] Date of Patent: Oct. 16, 1984

[54] APPARATUS FOR INDICATING TIRE PRESSURE

[75] Inventor: Jerry P. Malec, Omaha, Nebr.

[73] Assignee: Dual Dynamics, Inc., Lincoln, Nebr.

[21] Appl. No.: 500,990

[22] Filed: Jun. 3, 1983

[51] Int. Cl.³ .................... B60C 23/02; B60C 23/06;
G01L 19/12; F16K 15/20
[52] U.S. Cl. .................... 116/34 R; 73/146.3;
116/271; 137/111; 137/227
[58] Field of Search .................... 116/34 R, 271;
73/146.2, 146.8, 146.3; 137/225, 227, 111

[56] References Cited

U.S. PATENT DOCUMENTS

| | | | |
|---|---|---|---|
| 1,686,089 | 10/1928 | Kennedy et al. | 116/34 R |
| 2,059,045 | 10/1936 | Seymour | 137/225 |
| 3,208,425 | 9/1965 | Jousma et al. | 116/34 |
| 3,221,704 | 12/1965 | Johannsen | 116/271 |
| 3,260,233 | 7/1966 | Bergunder | 116/34 |
| 3,520,321 | 7/1970 | Skoli et al. | 137/510 X |
| 3,527,189 | 9/1970 | Perry | 116/34 |
| 3,756,190 | 9/1973 | Kendall | 116/34 |
| 3,827,393 | 8/1974 | Winther | 116/34 |
| 3,937,077 | 2/1976 | Klamm | 73/146.8 |
| 3,958,526 | 5/1976 | Liquie | 116/34 |
| 3,977,355 | 8/1976 | Lorenz | 116/34 |
| 3,999,503 | 12/1976 | Brannis | 116/34 |
| 4,058,009 | 11/1977 | Etter-Felix | 73/146.8 |
| 4,058,099 | 11/1977 | Etter-Felix | 73/146.8 |
| 4,131,876 | 12/1978 | Dees, Sr. | 116/34 |
| 4,375,788 | 3/1983 | Malec | 116/34 R |

FOREIGN PATENT DOCUMENTS 26265 2/1977 Japan ..................... 73/146.8

Primary Examiner—Charles Frankfort
Assistant Examiner—W. Morris Worth
Attorney, Agent, or Firm—Zarley, McKee, Thomte, Voorhees & Sease

[57] ABSTRACT

An apparatus for indicating tire pressure is disclosed which indicates whether the tire pressure in a pair of pneumatic tires is low, normal or excessive. The apparatus includes a valve body which is operatively connected to each of the tires and comprises a valve which longitudinally moves in the apparatus responsive to air pressure. The valve is operatively connected to a scale pan having an arcuate display portion at one end thereof. The display portion on the scale pan includes colored rectangular segments which are visible through a sight window in the apparatus. The scale pan pivots in response to valve movement and the colored segment visible in the sight window indicates whether the tire pressure is low, normal or excessive.

2 Claims, 9 Drawing Figures

APPARATUS FOR INDICATING TIRE PRESSURE

BACKGROUND OF THE INVENTION

This invention relates to an apparatus for indicating tire pressure and more particularly to an apparatus for indicating tire pressure in a pair of pneumatic tires.

Prior art devices are available which are designed to equalize the pressure between a pair of pneumatic tires. Devices are also available which indicate to the driver that a low pressure condition exists in one or both of the tires. Disadvantages of certain of the prior art devices which equalize air between the dual tires are that they are not sufficiently sensitive to changes in tire pressure. Some of the prior art devices permit the air in both tires to be lost if one of the tires experiences a sudden drop in pressure. A further disadvantage of some of the prior art devices is that they are not durable and frequently malfunction. A still further disadvantage of certain of the prior art devices is that they become contaminated with moisture and will freeze during periods of cold weather. Still another disadvantage in the prior art is that if the pressure sensing means thereof ruptures or fails due to leak or poor seal, the device will sometimes permit complete loss of air from one tire.

A disadvantage in a vast majority of the prior art devices is that they are electronic in nature and due experience some malfunctions. Additionally, the electronic devices are extremely expensive.

In applicant's earlier patent, a device was disclosed which was believed to represent a significant advance in the art. Applicant also filed a continuation-in-part application, Ser. No. 344,211 on Jan. 29, 1982 which also was believed to represent a significant advance in the art.

Although applicant's earlier devices were satisfactory, applicant's earlier devices did not indicate if excessive pressure was present. Therefore, it is a principal object of the invention to provide an apparatus for indicating tire pressure which does indicate low pressure, normal pressure or excessive pressure.

In applicant's earlier devices, it was necessary to disassemble the devices to change the calibration thereof. Accordingly, an object of this invention is to provide an apparatus for indicating tire pressure which may be calibrated without disssembling the apparatus.

Still another object of the invention is to provide an apparatus for indicating tire pressure which has fewer parts than the prior art devices.

A further object of the invention is to provide an apparatus for indicating tire pressure which includes a visual display in the form of a scale pan.

Still another object of the invention is to provide an apparatus for indicating tire pressure which is durable in use.

These and other objects will be apparatus to those skilled in the art.

SUMMARY OF THE INVENTION

An apparatus for indicating tire pressure is described including a valve body operatively connected to a pair of pneumatic tires. A diaphragm valve means is mounted in the apparatus and is movable in response to the air pressure in the tires. A scale pan is pivotally mounted in the apparatus and is operatively connected to the diaphragm valve so that movement of the diaphragm valve causes the scale pan to pivot. The scale pan includes a display portion having generally rectangular, colored segments appearing thereon in a side-by-side relationship. A generally rectangular sight window is provided on the apparatus through which can be seen the colored segments. As the diaphragm valve moves, the scale pan pivots to display the colored segments. When one of the colored segments is visible in the sight window, the operator will be able to visually determine that a condition of low air pressure exists in the tires. When another of the colored segments is visible in the sight window, the operator will be able to determine that the air pressure in the tires is normal. When the third colored segment is visible in the sight window, the operator will know that the air pressure in the tires is excessive. The apparatus may be calibrated by rotating the sight window assembly.

DESCRIPTION OF THE PREFERRED EMBODIMENT

Figure 1:
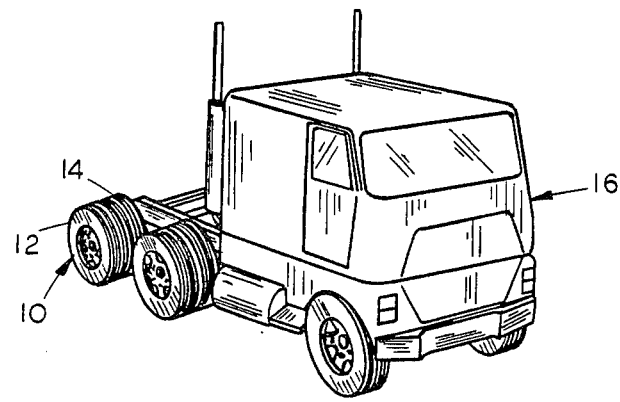
FIG. 1 is a front perspective view of a truck having the apparatus of this invention mounted thereon.
Figure 2:
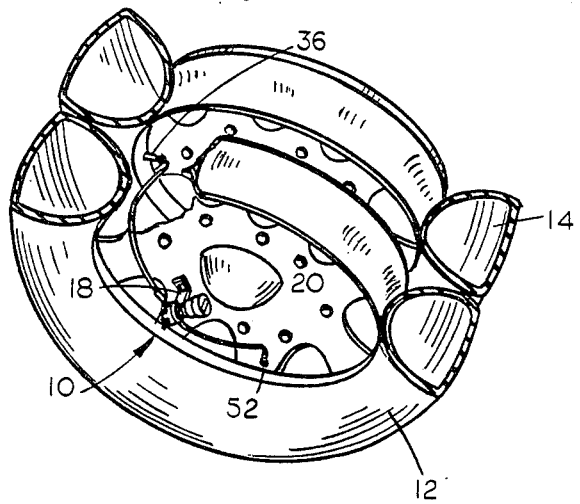
FIG. 2 is a partial perspective view illustrating the apparatus of this invention connected to a pair of pneumatic tires.
Figure 3:
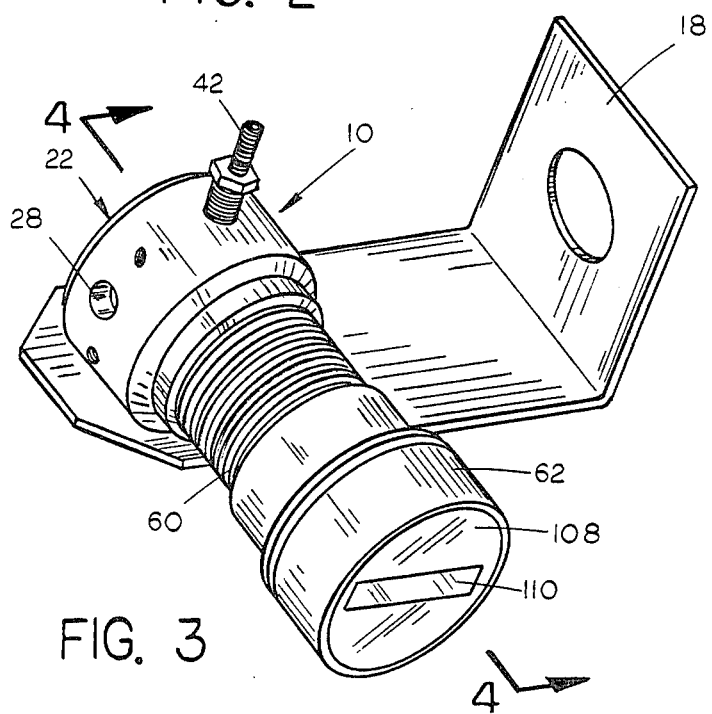
FIG 3 is a perspective view of the apparatus of this invention.

The apparatus of this invention is referred to generally by the reference numeral 10 while the reference numerals 12 and 14 refer to a pair of pneumatic tires such as commonly found on a truck 16 or the like. A mounting bracket 18 is provided for mounting the apparatus 10 on the wheel 20 as seen in FIG. 2.

Apparatus 10 comprises a valve body 22 having an internally threaded inner end 24 and an annular groove 26 provided inwardly thereof. Air passageway 28 extends inwardly from one side of the valve body 22 and is adapted to receive one end of an air hose 30. Air hose 30 is maintained on the valve body 22 by bracket 32 and bolts 34. Hose 30 is operatively connected to the valve stem 36 of tire 14.

Valve body 22 is also provided with an air passageway 38 extending inwardly from one side thereof and which communicates with chamber portion 40 in valve body 22. Air passageway 38 is internally threaded and is adapted to receive the valve 42 therein. Valve 42 is conventional in construction and is designed to permit air under pressure to be supplied to the chamber portion 40 as will be described in more detail hereinafter.

Figure 4:
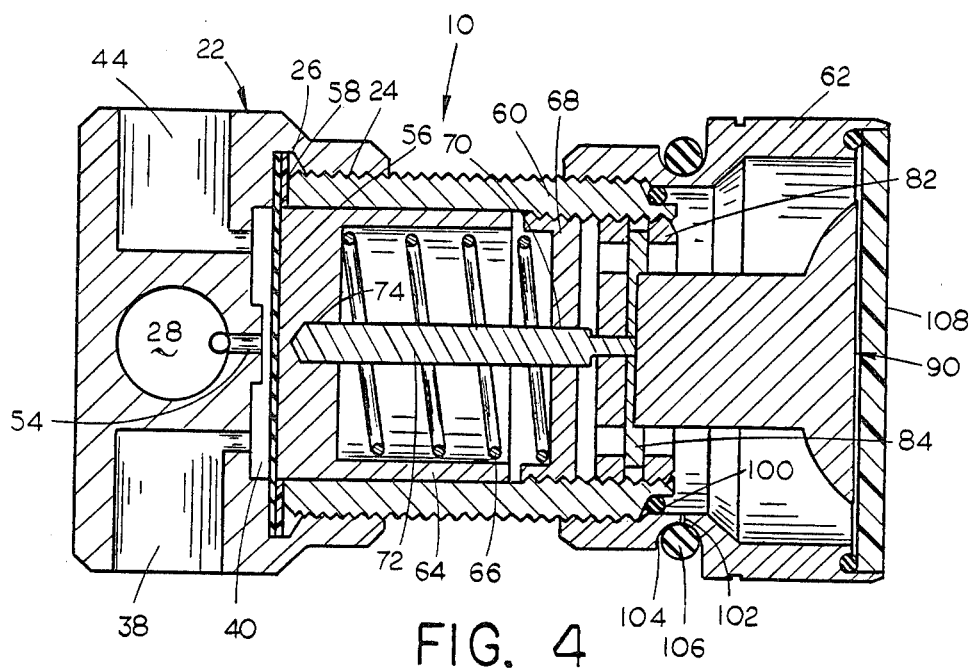
FIG. 4 is a longitudinal sectional view of the apparatus of this invention.

Valve body 22 is also provided with an air passageway 44 extending inwardly from one side thereof and which communicates with chamber portion 40 as illustrated in FIG. 4. Air passageway 44 is adapted to receive one end of the air hose 46. Air hose 46 is maintained in air passageway 44 by the brackets 48 and bolts 50. Air hose 46 is connected to the valve stem 52 of tire 12. As seen in FIG. 4, air passageway 28 includes a port 54 which extends therefrom to chamber portion 40.

Diaphragm valve 56 is received in the groove 26 and has a washer 58 mounted at one side thereof. Spring tube 60 is provided with an externally threaded surface and is threadably recevied by valve body 22 as illustrated in FIG. 4. The end of spring tube 60 engages the washer 58 to aid in maintaining the diaphragm valve 56 in position. As seen in FIG. 4, a display ring or cap 62 is threadably received on the other end of spring tube 60.

Figure 5:
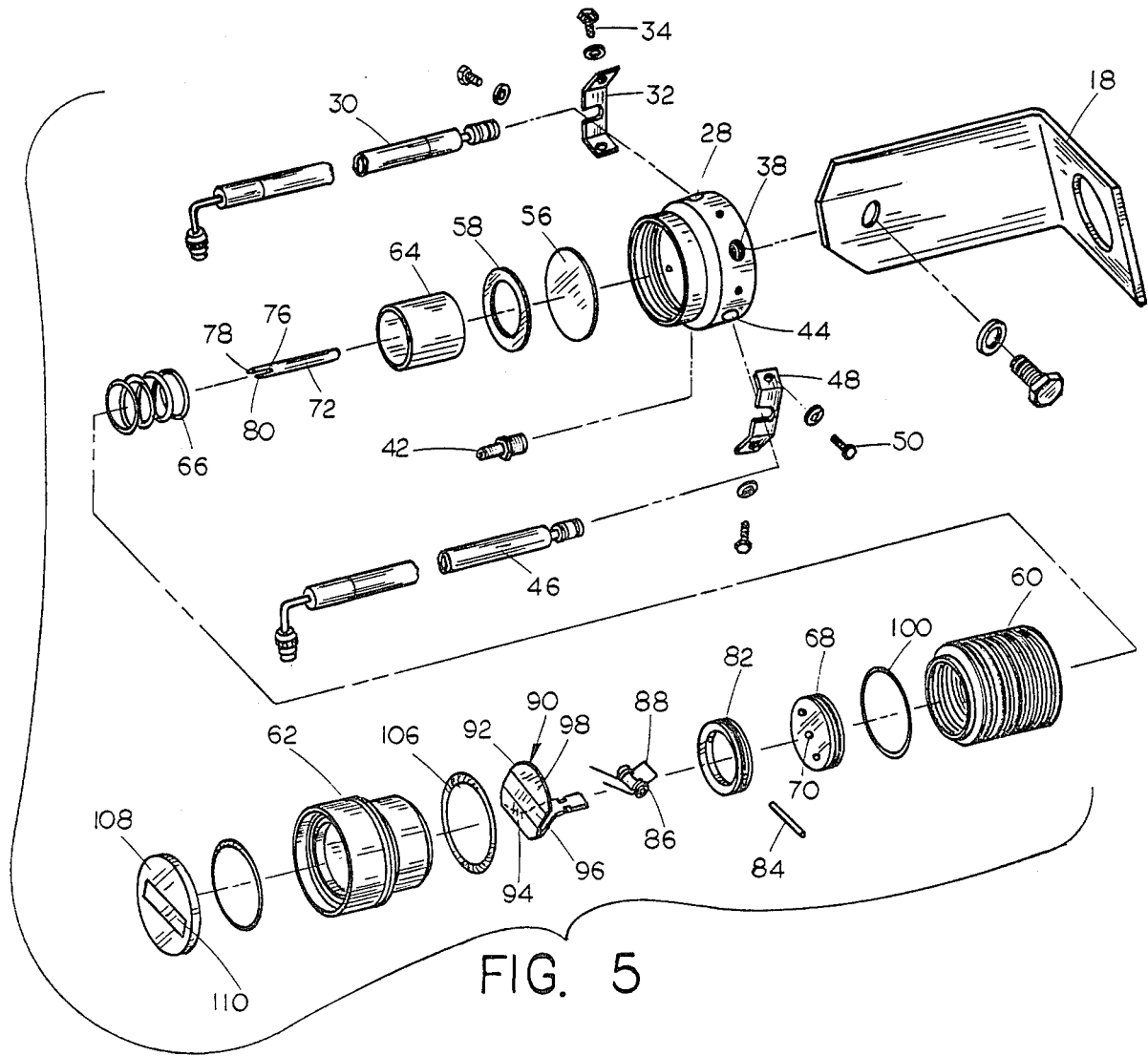
FIG. 5 is an exploded perspective view of the apparatus.
Figure 6:
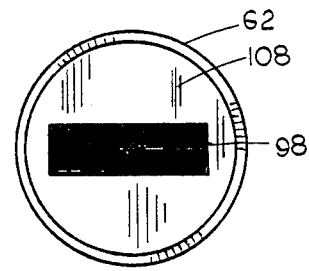
FIG. 6 is a plan view of the sight window indicating one of the colored segments being visible therein.
Figure 7:
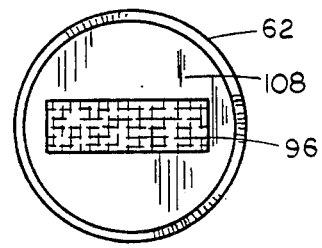
FIG. 7 is a view similar to FIG. 6 but which indicates a different colored segment being visible in the sight window.
Figure 8:
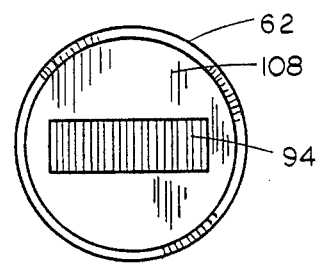
FIG. 8 is a view similar to FIGS. 6 and 7 except that a different colored segment is visible in the sight window.
Figure 9:
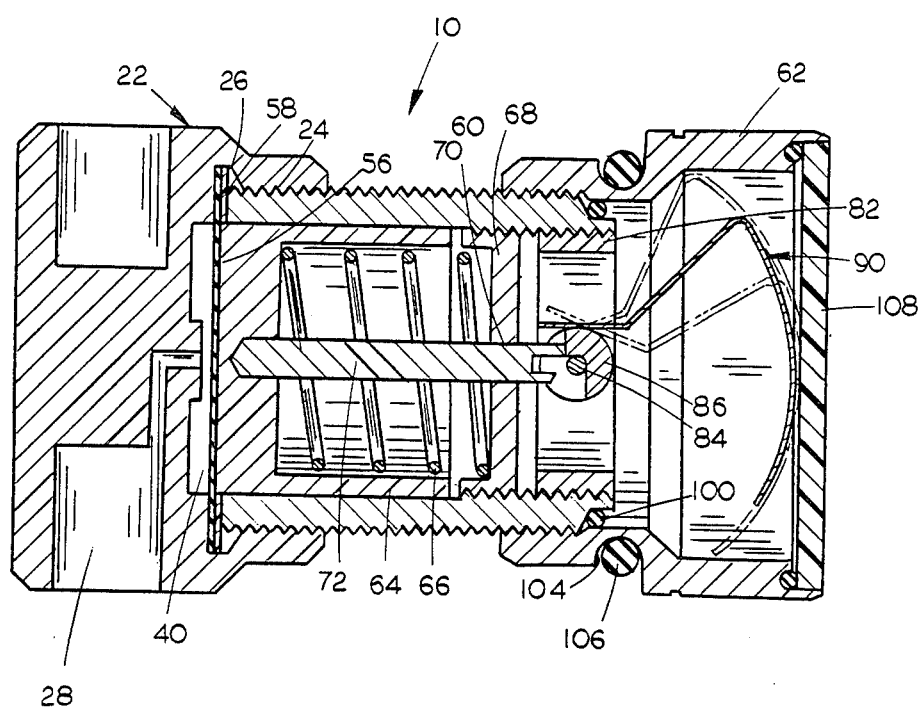
FIG. 9 is a longitudinal sectional view of the apparatus taken at 90° to the sectional view of FIG. 4.

Spring guide 64 is slidably mounted in the interior of spring tube 60 and has one end in engagement with the diaphragm valve 56 as seen in FIG. 4. Compression spring 66 is mounted in the interior of spring guide 64 so that one end thereof engages the spring guide 64 and so that its other end is in engagement with spring adjustment screw 68 threadably mounted in the spring tube 60. Adjustment screw 68 is provided with a central opening 70 which slidably receives display rod 72. One end of display rod 72 is mounted in bore 74 formed in spring guide 64. As seen in FIG. 5, the other end of display rod 72 is provided with a notch 76 positioned between end portions 78 and 80. As seen in FIG. 5, end portion 78 extends outwardly beyond the end portion 80.

Display adjustment screw 82 is threadably mounted at one end of spring tube 60 and has shaft 84 secured thereto. Barrel 86 is pivotally or rotatably mounted on shaft 84 and has a spring 88 mounted thereon. Scale pan 90 is operatively secured to the barrel 86 for rotation therewith. Scale pan 90 includes an arcuate display portion 92 having generally rectangular, colored segments 94, 96 and 98 provided thereon arranged in a side-by-side relationship. It is recommended that segment 94 be red, segment 96 be yellow and that segment 98 be black. O-ring 100 is mounted on the end of spring tube 60 and sealably engages the interior of cap 62 and the exterior of spring tube 60. Cap 62 is provided with an air passageway or vent opening 102 extending from the interior thereof to annual groove 104. O-ring 106 is mounted in grooves 104 and normally seals port or opening 102. However, when pressure builds up within cap 62, the O-ring 106 will unseat to permit air to be vented from the interior of cap 62. The outer end of cap 62 is provided with a disc-shaped member 108 having a generally rectangular sight window 110 formed therein. Member 108 is maintained in cap 62 by any convenient means. The sight window 110 is offset 1/64th of an inch from the center of the member 108 so that the member 108 may be selectively rotated 180° to permit calibration of the scale pan or the valve with respect to the sight window 110.

In operation, air may be introduced to the interior of the tires through the valve 42. In its normal operation, the valve 56 will be in the position illustrated in FIG. 4 so that the interiors of the two tires will be in air communication with each other through passageway 44, chamber portion 40, port 54 and passageway 28. If excessive pressure builds up in the tires, the valve 56 will move to the right as viewed in FIG. 4 and will cause the spring guide 64 to also move to the right. As spring guide 64 moves to the right, display rod 72 also moves to the right and the engagement of the end portion 78 with the barrel 86 causes the barrel 86 to rotate which in turn causes the scale pan to also rotate. As the scale pan 90 rotates or pivots, the red colored segment 94 will appear or will be visible in the sight window 110 which will indicate to the operator that excessive pressure exists in the tires. When the tire pressure within the tires is normal, the yellow colored segment 96 will be visible in the sight window. Should one of the tires lose pressure, the valve member 56 will move to the left as viewed in FIG. 4 to seal the port 54 thereby preventing air communication between the two tires. Movement of the valve 56 to the left as viewed in FIG. 4 will cause the scale pan 90 to pivot so that the black colored segment 98 will be visible in the sight window 110 to indicate to the driver or operator that a low pressure exists.

Thus it can be seen that the apparatus of this invention accomplishes at least all of its stated objectives.

I claim:

1. A tire monitor for use with a pair of pneumatic tires, comprising, an externally threaded, hollow spring tube means having first and second ends, a valve body threadably mounted on said first end of said spring tube means, having a hollow inner end which threadably receives said one end of said spring tube means, a diaphragm valve means mounted in said valve body at said one end of said spring tube means to define a first chamber in said valve body, said valve body having a first air passageway formed therein which communicates with said first chamber, a second air passageway formed therein which communicates with the interior of one of said tires and said first air passageway, a third air passageway formed therein which communicates with the interior of the other of said tires and said first chamber, and a fourth air passageway formed therein which communicates with said first chamber, valve means connected to said fourth air passageway to permit air under pressure to be selectively supplied to said fourth air passageway and said first chamber at times, said diaphragm valve means being movable between first and second positions, said diaphragm valve means sealing said first air passageway, when in its said first position, to prevent air communication between said second air passageway and said third air passageway, a spring guide slidably mounted in said spring tube means and having a first end adjacent one side of said diaphragm valve means, said spring guide having an open second end, a spring means received in said open second end of said spring guide, a spring adjustment screw threadably mounted in said spring tube means adjacent said second end for adjustably varying the compression of said spring means, an elongated display rod having one end secured to said spring guide and its other end slidably extending through said spring adjustment screw, a scale pan means operatively pivotally secured to said spring tube means at said second end thereof and extending therefrom, said display rod having its other end in operative engagement thereof with said scale pan means for causing the pivotal movement thereof, said scale pan means having a visual display portion comprising a plurality of generally rectangular display segments positioned in a side-by-side relationship, and a scale pan cover threadably mounted on said second end of said spring tube means enclosing said scale pan means, said scale pan cover having a generally rectangular window formed therein through which said display segments are visible for indicating the relative position of said diaphragm valve means with respect to said first air passageway, a display adjustment screw threadably mounted in said spring tube means at said second end, a rotatable barrel means mounted on said display adjustment screw and having its rotational axis disposed transversely with respect to said display rod, said scale pan means secured to said barrel means, said display rod engaging said barrel means to cause said barrel means and scale pan means to rotate in one direction, said barrel means being spring biased to yieldably urge said barrel means to rotate in a direction opposite to said one direction, rotation of said display adjustment screw causing said barrel means to be longitudinally movably adjusted.

2. The tire monitor of claim 1 wherein said rectangular window is offset from the center thereof to permit calibration of the apparatus by selective rotation of the scale pan cover 180° which changes the relationship of said window with respect to said scale pan cover.

* * * * *